(12) United States Patent
Erikson et al.

(10) Patent No.: US 11,904,715 B2
(45) Date of Patent: Feb. 20, 2024

(54) AUTOMATED PLUG-IN SYSTEM AND METHOD

(71) Applicant: Rivian IP Holdings, LLC, Plymouth, MI (US)

(72) Inventors: Tyler J. Erikson, Torrance, CA (US); Trent C. Warnke, Novi, MI (US); Kyle R. Underhill, Los Angeles, CA (US); Sara M. Eslinger, Redwood City, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 591 days.

(21) Appl. No.: 17/096,325

(22) Filed: Nov. 12, 2020

(65) Prior Publication Data
US 2022/0144107 A1     May 12, 2022

(51) Int. Cl.
| | | |
|---|---|---|
| *B60L 53/16* | (2019.01) | |
| *B60L 53/18* | (2019.01) | |
| *H01R 13/627* | (2006.01) | |
| *H01R 13/62* | (2006.01) | |
| *H01R 13/639* | (2006.01) | |
| *B60L 53/35* | (2019.01) | |

(52) U.S. Cl.
CPC ............... *B60L 53/16* (2019.02); *B60L 53/18* (2019.02); *B60L 53/35* (2019.02); *H01R 13/6205* (2013.01); *H01R 13/6272* (2013.01); *H01R 13/639* (2013.01)

(58) Field of Classification Search
CPC .......... B60L 53/16; B60L 53/18; B60L 53/35; B60L 53/30; H01R 13/6205; H01R 13/6272; H01R 13/639; H01R 2201/26; H01R 13/631
See application file for complete search history.

(56) References Cited

U.S. PATENT DOCUMENTS

| | | | |
|---|---|---|---|
| 5,909,100 A * | 6/1999 | Watanabe | B60L 53/126 320/108 |
| 6,307,347 B1 * | 10/2001 | Ronning | B60L 53/16 320/109 |
| 9,227,520 B2 * | 1/2016 | Kimura | B60L 53/16 |
| 9,352,652 B2 * | 5/2016 | Montemayor Cavazos | B60L 53/65 |
| 10,938,149 B2 * | 3/2021 | Li | H01R 13/639 |
| 11,424,573 B2 * | 8/2022 | Amini | H01R 13/112 |

(Continued)

OTHER PUBLICATIONS

Mar. 16, 2022 European Search Report issued in corresponding International Application No. 21204118.

*Primary Examiner* — Stacy Whitmore
(74) *Attorney, Agent, or Firm* — Foley & Lardner LLP

(57) ABSTRACT

Various disclosed embodiments include illustrative vehicle charging connectors, vehicle charging connector systems, and vehicle charging systems. In an illustrative embodiment a vehicle charging connector includes at least two electrical contacts configured to electrically connect with electrical contacts of a vehicle charge port. At least one controllable electromagnet may be configured to attract the vehicle charging connector to contact a charge port of an electric vehicle. The connector also includes at least one controllable electrically actuated mechanical connector configured to provide mechanical engagement and disengagement between the vehicle charging connector and the charge port.

20 Claims, 2 Drawing Sheets

(56) References Cited

U.S. PATENT DOCUMENTS

| | | | |
|---|---|---|---|
| 2012/0048983 A1* | 3/2012 | Bianco | G07F 15/005 242/388.9 |
| 2013/0049687 A1* | 2/2013 | Hershey | H02J 7/0045 320/109 |
| 2013/0193923 A1* | 8/2013 | Kimura | B60L 53/16 320/109 |
| 2015/0139761 A1* | 5/2015 | Qi | E04H 6/42 414/253 |
| 2017/0203662 A1* | 7/2017 | Hiebenthal | B60L 53/30 |
| 2018/0152031 A1* | 5/2018 | Zhai | B60L 53/65 |
| 2018/0201145 A1* | 7/2018 | Yellambalase | B60L 53/60 |
| 2019/0383637 A1* | 12/2019 | Teske | B60L 53/14 |
| 2020/0189408 A1* | 6/2020 | Ko | B60L 53/16 |
| 2020/0254893 A1* | 8/2020 | McColl | B60L 53/16 |
| 2021/0129696 A1* | 5/2021 | Westfall | B60L 53/66 |

* cited by examiner

AUTOMATED PLUG-IN SYSTEM AND METHOD

INTRODUCTION

The present disclosure relates to charging of electric vehicles.

The statements in this section merely provide background information related to the present disclosure and may not constitute prior art.

With the gain in usage of electric vehicles it becomes more important that vehicles be plugged in when not in use. Relying on a human to plug in an electric vehicle after the vehicle has been parked is an inherently unreliable process. This may be especially problematic when the electric vehicle is used for business operations. For business operations, an uncharged vehicle may equate to a loss of revenue. If the vehicle is part of a fleet of electric vehicles, an uncharged vehicle may result in additional problems in situations where the vehicles in the fleet are parked one vehicle behind another in lanes. In this case, the impact of having an uncharged vehicle can mean other vehicles are stuck in place as well and cannot be used to do their job or may be delayed in doing the job.

BRIEF SUMMARY

Various disclosed embodiments include illustrative vehicle charging connectors, vehicle charging connector systems, and vehicle charging systems.

In an illustrative embodiment a vehicle charging connector includes at least two electrical contacts configured to electrically connect with electrical contacts of a vehicle charge port and at least one controllable electromagnet may be configured to attract the vehicle charging connector to contact a charge port of an electric vehicle. The connector also includes at least one controllable electrically actuated mechanical connector configured to provide mechanical engagement and disengagement between the vehicle charging connector and the charge port.

In another illustrative embodiment, a vehicle charging connector system includes a cable hanging from an overhead site. A first end of the cable may be configured with at least two electrical conductors for conducting electricity. The system also includes a vehicle charging connector coupled to a second end of the cable. The vehicle charging connector further includes at least two electrical contacts configured to electrically connect with electrical contacts of a vehicle charge port least one controllable electromagnet configured to attract the vehicle charging connector to contact a charge port of an electric vehicle and at least one controllable electrically actuated mechanical connector configured to provide mechanical engagement and disengagement between the vehicle charging connector and the charge port.

In another illustrative embodiment, a vehicle charging system includes an electric vehicle supply equipment (EVSE) charging cabinet, and a cable hanging from an overhead site at a first end of the cable, the cable being configured with at least two electrical conductors for conducting electricity and the cable electrically coupled, via the first end, to the EVSE charging cabinet, and a vehicle charging connector coupled to a second end of the cable, the vehicle charging connector including at least two electrical contacts configured to electrically connect with electrical contacts of a vehicle charge port, at least one controllable electromagnet configured to attract the vehicle charging connector to contact a charge port of an electric vehicle. At least one controllable electrically actuated mechanical connector configured to provide mechanical engagement and disengagement between the vehicle charging connector and the charge port.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
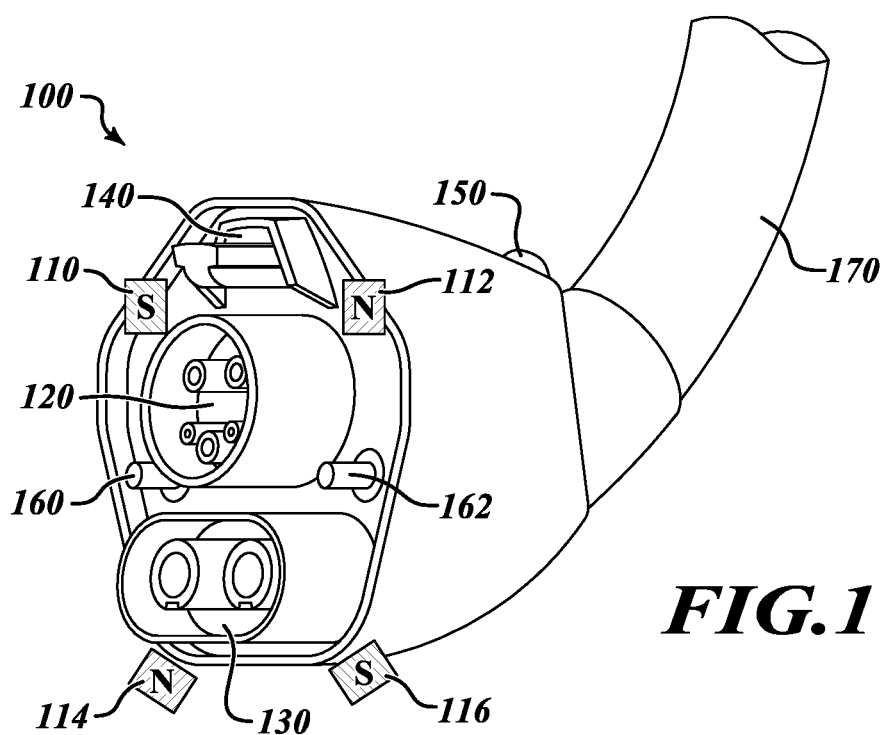
FIG. 1 is a perspective view of an illustrative vehicle charging connector.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative vehicle charging connectors, vehicle charging connector systems, and vehicle charging systems.

It will be appreciated that various disclosed charging systems, equipment, and methods may be suited for charging large numbers of vehicles such as but not limited to fleet vehicles. For example, it may be beneficial to have a fleet of delivery trucks that all charge during overnight hours, to be deployed during the day for deliveries.

By combining use of gravity, use of electromagnets, simple vehicle parking sensors/aids, and a retractable coupler pin, various embodiments can help enable computer controlled and automated combined charging system (CCS) coupler connection and disconnection for semi-autonomous and autonomous charging.

Figure 2:
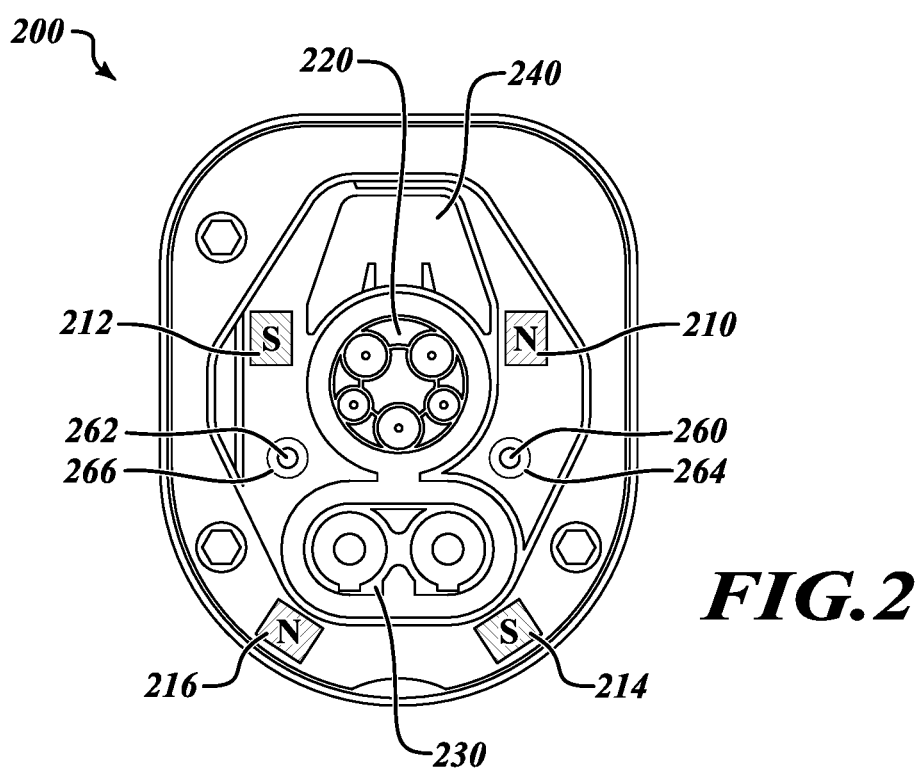
FIG. 2 is a plan view of an illustrative vehicle charging port.

Referring now to FIG. 1, a standard CCS1 coupler 100 is depicted. In various embodiments, the coupler 100 may be modified with one or more computer controlled electromagnets such as electromagnets 110, 112, 114, and 116. In various embodiments, the coupler 100 includes four (4) of the computer-controlled electromagnets 110, 112, 114, and 116. The coupler 100 also includes a first set of conductors 120 for providing AC charging power to a vehicle (not shown in FIG. 1) and a second set of conductor pins 130 for providing DC charging power to the vehicle. A coupler latch 140 is actuated with a coupler button 150 which is configured to release the latch 140 from engaging with a latch receiver 240 (FIG. 2). In various embodiments, a coupler button 150 may be electrically actuated such that the latch 140 may be released in response to a control command. In various embodiments the coupler 100 may include one or more motorized coupler pins 160 and 162. For example, the coupler pins 160 and 162 may include screw threads to engage with threaded apertures 260 and 262 (FIG. 2) of a vehicle receiver 200 (FIG. 2). The coupler pins 160 and 162 may be rotated by one or more electric motors which may be actuated by control command.

Referring additionally to FIG. 2, in various embodiments the coupler 100 is configured to couple to the vehicle receiver 200. The receiver 200 may also include computer controlled electromagnets 210, 212, 214, and 216. In various embodiments, the electromagnets 210, 212, 214, and 216 on the vehicle receiver 200 may have springs to allow them to move with the coupler 100 as it engages with the receiver 200.

In operation, if the coupler 100 is located freely hanging close to the receiver 200, then the electromagnets 110, 112, 114, and 116 may be energized at the same time that the receiver magnets 210, 212, 214, and 216 are energized. The polarity of the electromagnet 110 will be controlled to be opposite to the polarity of the electromagnet 210, the polarity of the electromagnet 112 will be controlled to be opposite to the polarity of the electromagnet 212, the polarity of the electromagnet 114 will be controlled to be opposite to the polarity of the electromagnet 214, and the polarity of the electromagnet 116 will be controlled to be opposite to the polarity of the electromagnet 216. Due to the opposing polarities of the receiver magnets and the coupler magnets, the coupler 100, which is hanging from its cable 170 or another cable, will be drawn to and engage with the receiver 200. The motorized coupler pins 160 and 162 will engage with conical shaped entrances 264 and 266 of apertures 260 and 262, respectively. The conical entrances 264 and 266 will guide the coupler pins 160 and 162 into the receiver apertures 260 and 262, respectively. The coupler pins 160 and 162 are rotated, thereby causing the threads of the coupler pins 260 and 262 to engage with the threads in the apertures 260 and 262. This operation drives the coupler 100 into a solid electrical connection of one or more of pin sets 120 and 130 with receivers 220 and 230. Once coupled, charging power is then provided through the cable 170 to the coupler 100 and to the vehicle receiver 200 where it charges the vehicle's batteries (not shown).

When the vehicle is done being charged or at some other scheduled or commanded time, the coupler 100 may be disengaged from the vehicle receiver 200. The disengagement is carried out by actuating the coupler button 150 which causes the latch 140 to release. The motorized coupler pins 160 and 162 are caused to rotate, thereby unscrewing the motorized coupler pins 160 and 162 from the apertures 260 and 262. When the coupler pins 160 and 162 are disengaged from the receivers 260 and 262, the electromagnets 110, 112, 114, 116, 210, 212, 214, and 216 are activated in such a manner to repel the coupler 100 from the receiver 200. For example, the polarity of the electromagnet 110 will be controlled to be the same as the polarity of the electromagnet 210, the polarity of the electromagnet 112 will be controlled to be the same as the polarity of the electromagnet 212, the polarity of the electromagnet 114 will be controlled to be the same as the polarity of the electromagnet 214, and the polarity of the electromagnet 116 will be controlled to be the same as the polarity of the electromagnet 216.

Figure 3:
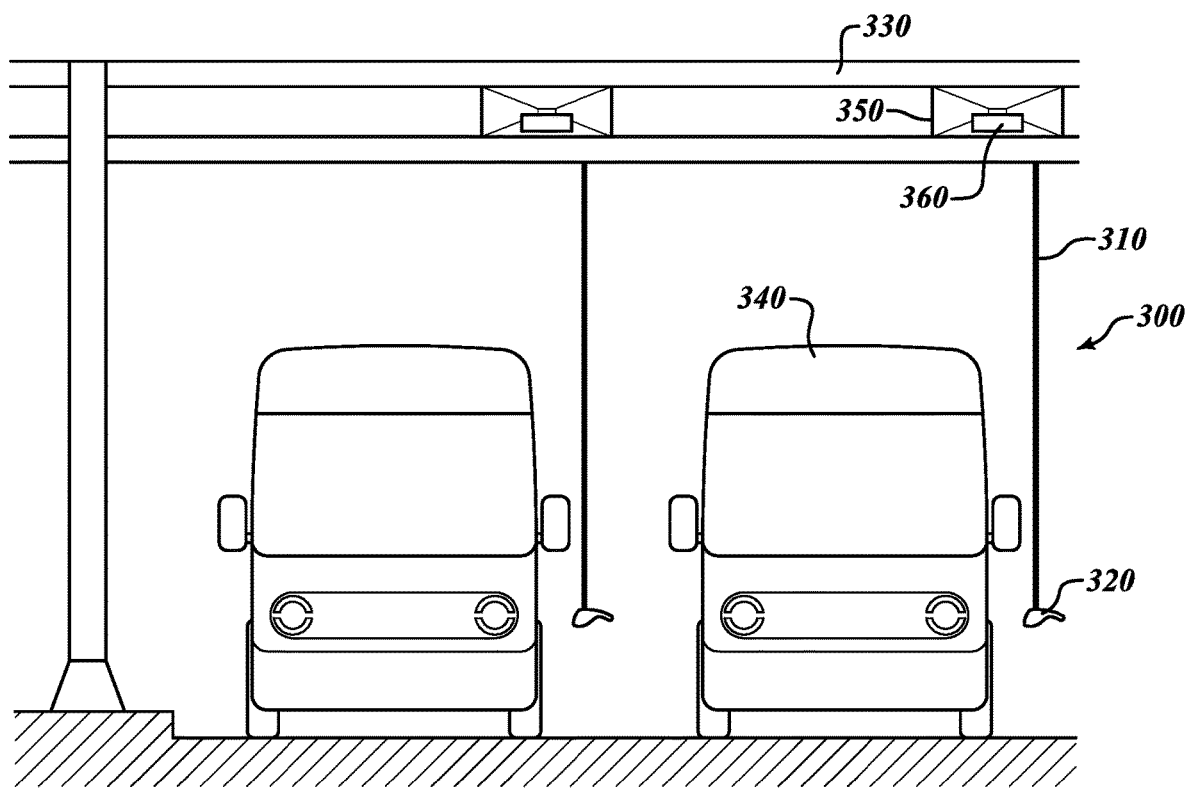
FIG. 3 is a front plan view in partial schematic form of an illustrative automated plug-in system.

Referring additionally to FIG. 3, in various embodiments a cable/coupler system 300 hangs down from an overhead gantry 330 or any overhead structure. The system 300 may hang on a conductor cable 310 or on a support wire or the like as long as it is able to hold a coupler 320 at a specified height off the ground and the coupler 320 can swing freely. A vehicle 340, such as but not limited to a fleet vehicle, pulls into a charging position or a charging bay where an Electric Vehicle Supply Equipment (EVSE) charging cabinet or dispenser 350 may be located. Dispenser 350 may include a processor 360 which is used to control the electromagnets, coupler pins, and latch of coupler 100. Although processor 100 is depicted as being located in the dispenser 350, other various embodiments may locate the controlling processor at various other locations, for example, but not limited to located in a cloud server, located in an office, located onboard the vehicle, When the vehicle 340 arrives in the charging position, it opens its charge-port door, thereby exposing a receiver, such as the receiver 200 (FIG. 2). The vehicle 340 is parked so that the face of the coupler 320 hangs within a predetermined distance, such as for example three inches or so, of the charge-port inlet that permits the electromagnets to interact electromagnetically. The electromagnets on the vehicle side and the coupler side are then energized, thereby creating an electromagnetic force of attraction that connects the coupler 320 to the vehicle receiver 200. With proper alignment, the coupler pins 160 and 162 insert into their respective apertures 260 and 262, which latch to the coupler 320 and pull the coupler pins 160 and 162 into the receiver apertures 260 and 262 thereby fully engaging the latch 140.

To disconnect the receiver 200 from the coupler 320, the coupler button 150 is actuated and the motorized coupler pins 160 and 162 are run in reverse, thereby pushing the coupler 320 out to the point of near disengagement. The electromagnets 110, 112, 114, 116, 210, 212, 214, and 216 are then energized with 'like' polarity, thereby providing the final push entailed for complete detachment. The vehicle 340 is now fully disconnected and closes the charge-port door.

It will be appreciated that in various embodiments the vehicle charging connector or coupler 100 may have at least two electrical contacts 120 (FIG. 1) configured to electrically connect with electrical contacts 220 (FIG. 2) of a vehicle charge port or the vehicle receiver 200. At least one controllable electromagnet (such as the electromagnets 110, 112, 114, 116, 210, 212, 214, and 216) may be configured to attract the coupler 100 to contact a charge port or the charge receiver 200 of the electric vehicle 340. At least one controllable electrically actuated mechanical coupler pin may be configured to provide mechanical engagement and disengagement between the coupler 100 and the receiver 200. It should also be noted that vehicle charging connector 100 may be any of a variety of EV connectors including, but not limited to CCS2 connectors (European version), Tesla connectors, Chademo connectors, GB/T connectors, etc. As well, complementary receiver 200 configurations would be used to accommodate the particular type of connector 100.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A vehicle charging connector comprising:
   at least two electrical contacts configured to electrically connect with electrical contacts of a vehicle charge port of an electric vehicle;
   at least one controllable electromagnet configured to attract the vehicle charging connector to contact the vehicle charge port, wherein the at least one electromagnet is energized responsive to the electric vehicle being parked in proximity to the vehicle charging connector with the vehicle charging connector being within a predetermined distance of the vehicle charge port and the charge port door of the electric vehicle being opened; and
   at least one controllable electrically actuated mechanical connector configured to provide mechanical engagement and disengagement between the vehicle charging connector and the vehicle charge port.

2. The connector of claim 1, wherein the vehicle charging connector includes a combined charging system (CCS) connector.

3. The connector of claim 1, wherein the vehicle charging connector includes at least two electromagnets.

4. The connector of claim 3, wherein the at least two electromagnets are controlled at opposite polarities.

5. The connector of claim 1, wherein the at least one mechanical connector includes at least two screw connectors that are adapted to engage associated apertures of the vehicle charge port.

6. The connector of claim 1, wherein the at least one controllable electrically actuatable mechanical connector includes a motorized screw connector that is adapted to engage an associated aperture of the vehicle charge port.

7. The connector of claim 1, wherein the vehicle charging connector includes a connector latch.

8. A vehicle charging connector system comprising:
   a cable hanging from an overhead site at a first end of the cable, the cable being configured with at least two electrical conductors for conducting electricity; and
   a vehicle charging connector coupled to a second end of the cable, the vehicle charging connector including:
      at least two electrical contacts configured to electrically connect with electrical contacts of a vehicle charge port of an electric vehicle;
      at least one controllable electromagnet configured to attract the vehicle charging connector to contact the vehicle charge port, wherein the at least one electromagnet is energized responsive to the electric vehicle being parked in proximity to the vehicle charging connector with the vehicle charging connector being within a predetermined distance of the vehicle charge port and the charge port door of the electric vehicle being opened; and
      at least one controllable electrically actuated mechanical connector configured to provide mechanical engagement and disengagement between the vehicle charging connector and the vehicle charge port.

9. The system of claim 8, wherein the vehicle charging connector includes a combined charging system (CCS) connector.

10. The system of claim 8, wherein the vehicle charging connector includes at least two electromagnets.

11. The system of claim 10, wherein the at least two electromagnets are controlled at opposite polarities.

12. The system of claim 8, wherein the at least one mechanical connector includes at least two screw connectors that are adapted to engage associated apertures of the vehicle charge port.

13. The system of claim 8, wherein the at least one controllable electrically actuatable mechanical connector includes a motorized screw connector that is adapted to engage an associated aperture of the vehicle charge port.

14. The system of claim 8, wherein the vehicle charging connector includes a connector latch.

15. A vehicle charging system comprising:
- an electric vehicle supply equipment (EVSE) charging cabinet;
- a cable hanging from an overhead site at a first end of the cable, the cable being configured with at least two electrical conductors for conducting electricity and the cable electrically coupled, via the first end, to the EVSE charging cabinet; and
- a vehicle charging connector coupled to a second end of the cable, the vehicle charging connector including:
  - at least two electrical contacts configured to electrically connect with electrical contacts of a vehicle charge port of an electric vehicle;
  - at least one controllable electromagnet configured to attract the vehicle charging connector to contact the vehicle charge port, wherein the at least one electromagnet is energized responsive to the electric vehicle being parked in proximity to the vehicle charging connector with the vehicle charging connector being within a predetermined distance of the vehicle charge port and the charge port door of the electric vehicle being opened; and
  - at least one controllable electrically actuated mechanical connector configured to provide mechanical engagement and disengagement between the vehicle charging connector and the vehicle charge port.

16. The system of claim 15, further comprising, a processor configured to control the at least one controllable electrically actuated mechanical connector.

17. The system of claim 15, further comprising, a processor configured to control the at least one controllable electromagnet.

18. The system of claim 15, wherein the processor is configured to control the at least one controllable electromagnet by activating a first polarity for engagement and activating a second polarity opposite the first polarity for disengagement.

19. The system of claim 8, wherein the vehicle charging connector includes a combined charging system (CCS) connector Type 1.

20. The system of claim 8, wherein the vehicle charging connector includes a combined charging system (CCS) connector Type 2.

* * * * *